United States Patent
Singh et al.

(10) Patent No.: US 10,958,174 B1
(45) Date of Patent: Mar. 23, 2021

(54) LIGHT LOAD DETECTOR CIRCUIT FOR INDUCTIVE DC-DC CONVERTER

(71) Applicant: Dialog Semiconductor Inc., Campbell, CA (US)

(72) Inventors: Manmeet Singh, Chandler, AZ (US); Pietro Gallina, Candler, AZ (US); Rosario Pagano, Phoenix, AZ (US); Vijay Choudhary, Chandler, AZ (US); Vivek Parasuram, Tempe, AZ (US); John Kesterson, Scottsdale, AZ (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 16/504,675

(22) Filed: Jul. 8, 2019

(51) Int. Cl.
H02M 3/158 (2006.01)
H02M 1/00 (2006.01)

(52) U.S. Cl.
CPC .......... H02M 3/1582 (2013.01); H02M 1/00 (2013.01); *H02M 2001/0009* (2013.01); *H02M 2001/0032* (2013.01)

(58) Field of Classification Search
CPC ........ G01R 19/0092; G01R 19/165547; G01R 19/16552; G01R 19/16519; G01R 19/16566; H02M 3/1588; H02M 2001/0009; H02M 3/158; H02M 3/1582; H02M 1/08; H02M 2001/0016; H02M 2001/0032
See application file for complete search history.

(56) References Cited

U.S. PATENT DOCUMENTS

| 6,160,388 A | * | 12/2000 | Skelton | H02M 3/1588 323/282 |
| 2005/0040800 A1 | * | 2/2005 | Sutardja | H02M 3/1584 323/283 |
| 2006/0261860 A1 | * | 11/2006 | Yamada | H02M 3/156 327/77 |
| 2010/0289473 A1 | * | 11/2010 | Ishii | H02M 3/156 323/284 |
| 2012/0001659 A1 | * | 1/2012 | Balmelli | H02M 3/156 327/103 |
| 2012/0236612 A1 | * | 9/2012 | Uno | H02M 1/4225 363/126 |
| 2015/0055383 A1 | * | 2/2015 | Xu | H02M 3/33507 363/21.18 |

(Continued)

*Primary Examiner* — Gustavo A Rosario-Benitez
(74) *Attorney, Agent, or Firm* — Saile Ackerman LLC; Stephen B. Ackerman

(57) ABSTRACT

A power converter and method to detect a light load condition at an output of the power converter are presented. The power converter may have an inductor and a resistive element connected between an input of the power converter and an input of the inductor. The power converter may have a first chopping unit to generate a chopped voltage signal at an output of said first chopping unit, wherein the chopped voltage signal is generated by chopping an inductor voltage at the input of said inductor based on a duty cycle of the power converter. The power converter may have a reference current source, wherein the reference current source and a replica resistive element are arranged in series. The power converter may have a comparator unit to generate, based on the reference potential and based on the chopped voltage signal, a signal indicative of said light load condition.

10 Claims, 14 Drawing Sheets

HS stands for High-Side

(56) References Cited

U.S. PATENT DOCUMENTS

| | | | | |
|---|---|---|---|---|
| 2015/0301091 A1* | 10/2015 | Childs | .............. | G01R 19/16519 |
| | | | | 324/762.09 |
| 2015/0349636 A1* | 12/2015 | Bodano | ................ | H02M 3/158 |
| | | | | 323/271 |
| 2015/0355242 A1* | 12/2015 | Ozawa | ............... | G01R 19/0092 |
| | | | | 324/123 R |
| 2016/0111956 A1* | 4/2016 | Childs | ................... | H02M 3/156 |
| | | | | 323/271 |
| 2017/0063228 A1* | 3/2017 | Kimura | ................ | H02M 3/158 |
| 2019/0324063 A1* | 10/2019 | Baorda | ................ | H02M 3/158 |

\* cited by examiner

HS stands for High-Side

HS stands for High-Side

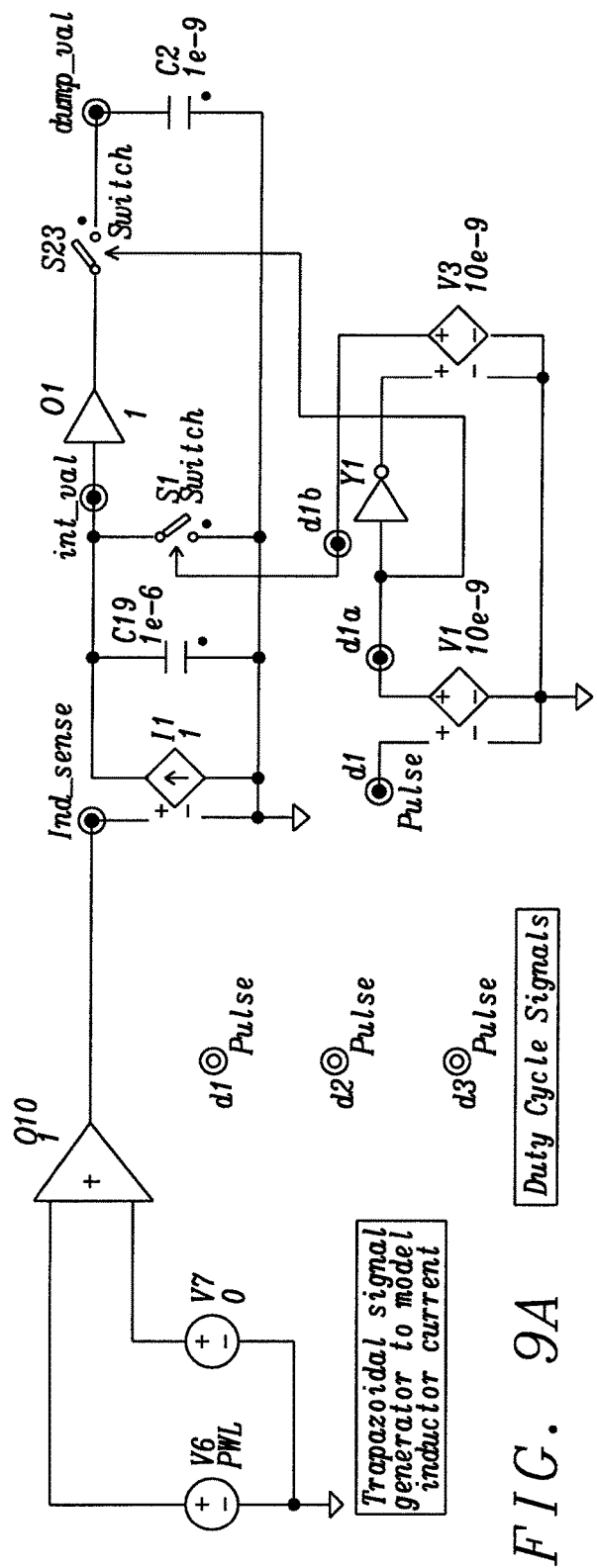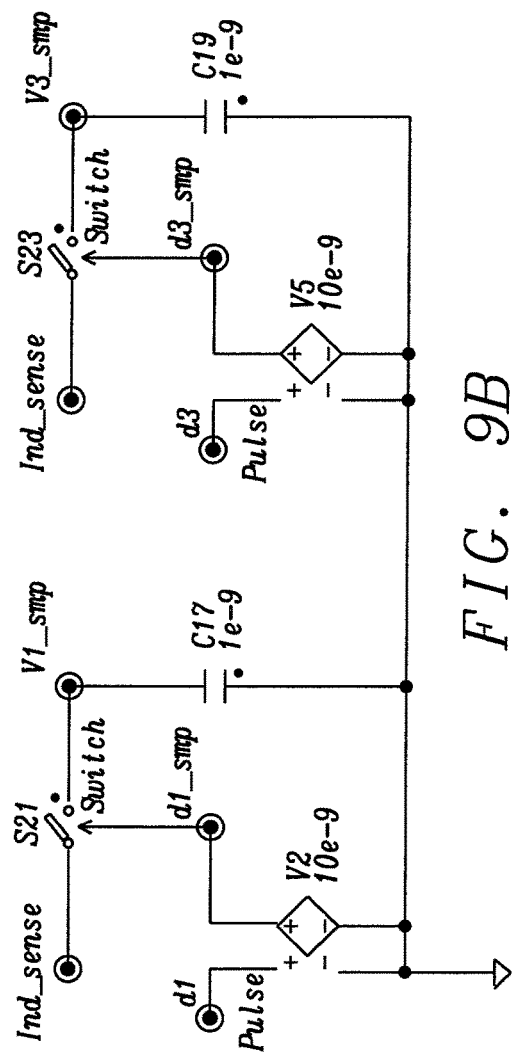
FIG. 9A
FIG. 9B

| Cursors | | | min | max | pp | mean | rms | acrms | freq period | integral |
|---|---|---|---|---|---|---|---|---|---|---|
| Cursors | 3.01019e-6 | 4.00597e-6 | 995.78e-9 | | | | | | | |
| | 3.01019e-6 | 4.00597e-6 | 995.78e-9 | | | | | | | |
| V(Ind_sense) | 1.02854 | 1.01672 | -11.8158e-3 | 2.00003 | 1.00028 | 1.65768 | 1.68122 | 280.378e-3 | | 1.65068e-6 |
| V(d1) | 5.0959 | 2.98594 | -2.10996 | 10 | 10 | 2.49347 | 4.93616 | 4.26008 | | 2.48295e-6 |
| V(d2) | 0 | 0 | 0 | 5 | 5 | 2.76165 | 3.69336 | 2.45238 | | 2.75e-6 |
| V(d3) | 0 | 2.01406 | 2.01406 | 5 | 5 | 1.00016 | 2.22082 | 1.98285 | | 995.944e-9 |
| V(int_val) | 1.63934 | 1.63502 | -4.32563e-3 | 1.64445 | 1.64445 | 796.297e-3 | 945.3e-3 | 509.415e-3 | | 792.936e-9 |
| V(damp_val) | 1.63934 | 1.63502 | -4.32563e-3 | 1.64437 | 10.2677e-3 | 1.64435 | 1.64435 | 358.665e-6 | | 1.63741e-6 |
| V(d1a) | 5 | 5 | 0 | 5 | 5 | 29.0229e-3 | 380.664e-3 | 379.556e-3 | | 28.9004e-9 |
| V(d1b) | 0 | 0 | 0 | 5 | 5 | 50.2119e-3 | 500.85e-3 | 498.326e-3 | | 50e-9 |
| V(InD1_m_raw) | 5.25516e-3 | 941.238e-6 | -4.31392e-3 | 358.091e-6 | 358.091e-3 | 44.519e-3 | 102.202e-3 | 91.9965e-3 | | 44.3311e-9 |
| V(InD2_m_raw) | 0 | 0 | 0 | 1.02015 | 1.02015 | 279.592e-3 | 435.397e-3 | 333.765e-3 | | 278.412e-6 |
| V(InD3_m_raw) | 295.052e-3 | 295.052e-3 | 55.5112e-18 | 295.052e-3 | 295.052e-3 | 33.9614e-3 | 84.6845e-3 | 77.5763e-3 | | 33.818e-9 |
| V(InD1_hold) | 358.102e-3 | 358.091e-3 | -11.0919e-6 | 358.091e-3 | 11.0919e-6 | 358.094e-3 | 358.094e-3 | 4.84081e-6 | | 356.583e-9 |
| V(InD2_hold) | 1.02015 | 1.02015 | 0 | 1.02015 | 0 | 1.02015 | 1.02015 | 0 | | 1.01584e-6 |
| V(InD3_hold) | 295.052e-3 | 295.052e-3 | 55.5112e-18 | 295.052e-3 | 55.5112e-18 | 295.052e-3 | 295.052e-3 | 5.72392e-9 | | 293.807e-9 |
| V(InD3_o_raw) | 296.812e-3 | 296.815e-3 | 3.0625e-6 | 296.815e-3 | 296.815e-3 | 30.8207e-3 | 78.724e-3 | 72.44e-3 | | 30.6906e-9 |
| V(InD3o_hold) | 296.812e-3 | 296.815e-3 | 3.0625e-6 | 296.815e-3 | 3.0625e-6 | 296.812e-3 | 296.812e-3 | 91.1268e-9 | | 295.559e-9 |
| V(avg_meas) | 1.6733 | 1.67329 | -11.0919e-6 | 1.6733 | 11.0919e-6 | 1.6733 | 1.6733 | 4.84073e-6 | | 1.66623e-6 |
| V(avg_observe) | 1.67506 | 1.67505 | -8.02937e-6 | 1.67506 | 11.0919e-6 | 1.67505 | 1.67505 | 4.84005e-6 | | 1.67799e-6 |

FIG. 10B

LIGHT LOAD DETECTOR CIRCUIT FOR INDUCTIVE DC-DC CONVERTER

TECHNICAL FIELD

The present document relates to DC (Direct Current)-DC converters. In particular, the present document relates to a DC-DC converter with a light load detector circuit configured to sense an input current of the DC-DC converter.

BACKGROUND

Switching power regulators such as buck, boost, or buck-boost converters may be operated in different modes of operation dependent on the load which is applied to their output. In a typical application scenario, an average load is applied to the output of a power converter which requires the power converter to be operated in a pulse width modulation (PWM) mode, notably in a continuous current mode (CCM, sometimes also denoted as continuous conduction mode). If, however, a light load situation is detected, the power converter may switch to a pulse frequency modulation (PFM) mode in order to reduce switching losses and save energy. A light load situation may be detected e.g. if an output current drawn from the power converter drops below a pre-determined current threshold.

SUMMARY

It is an object of the present invention to provide a power converter configured to detect such a light load condition in a novel manner. Moreover, it is an object of the present invention to detect a light load condition with improved accuracy.

According to an aspect, a power converter is configured to detect a light load condition at an output of the power converter. The power converter may be e.g. a buck mode power converter, a boost mode power converter, or a buck-boost mode power converter. The power converter may comprise an inductor and a resistive element connected between an input of the power converter and an input of the inductor. The power converter may comprise a first chopping unit configured to generate a chopped voltage signal at an output of said first chopping unit, wherein the chopped voltage signal is generated by chopping an inductor voltage at the input of said inductor based on a duty cycle of the power converter. The power converter may comprise a replica resistive element coupled between the input of the power converter and a reference potential. The power converter may comprise a reference current source, wherein said reference current source and said replica resistive element are arranged in series. Further, the power converter may comprise a comparator unit configured to generate, based on the reference potential and based on the chopped voltage signal, a signal indicative of said light load condition.

The resistive element and the replica resistive element may be simple resistors (shunts). Alternatively, the resistive element and the replica resistive element may be embodied as transistors. For instance, the resistive element and the replica resistive element may be any suitable transistors, such as, for example, metal-oxide-semiconductor field effect transistors (MOSFETs), insulated-gate bipolar transistors (IGBTs), MOS-gated thyristors, or other suitable power devices. In case of MOSFETs, the respective resistive elements may be formed by the drain-source-channels of the MOSFETs. At this, each transistor may have a gate to which a respective driving voltage or control signal may be applied to turn the transistor on (i.e. to close the transistor) or to turn the transistor off (i.e. to open the transistor). In this document, the resistance of a transistor (or switching element) when it is turned on is denoted as on-time resistance of the transistor. When the transistor is turned off, the respective resistance is denoted as off-time resistance and may be assumed to approach infinity.

A ratio between a resistance of the resistive element and a resistance of the replica resistive element is assumed to be known in advance and may be determined in a pre-operational-phase. In case transistors are used as respective resistive elements, a ratio between an on-time resistance of the transistor embodying the resistive element and an on-time resistance of the transistor embodying the replica resistive element is assumed to be constant and known in advance.

In other words, the first chopping unit may be configured to sense the inductor voltage during certain time intervals, wherein said time intervals depend on the duty cycle of the power converter. More specifically, the first chopping unit may be configured to connect, during first time intervals, the input of said inductor to the output of the first chopping unit. Moreover, the first chopping unit may be configured to connect, during second time intervals, the input of said power converter to the output of the first chopping unit. The first time intervals and the second time intervals may be based on the duty cycle of the power converter.

Unlike prior-art techniques which rely on sensing directly the output current of the power converter, the presented power converter is capable of indirectly measuring the output current by sensing the input current of the power converter and of taking into account the duty cycle of the power converter. In particular, the presented power converter is capable of detecting a light load condition when the output current drops below a reference current (as provided by the reference current source) by sensing the input current of the power converter. Therefore, there is no need for an output current sense resistor. By taking into account the duty cycle of the power converter when sensing the input current, it becomes possible to cancel out the duty cycle and make the output current detection independent of the duty-cycle.

In general, the duty cycle may be seen as a numerical value between 0 and 1 indicative of (a) the ratio of the input current to the output current of the power converter, or (b) the ratio of the output voltage to the input voltage of the power converter which results from a certain switching scheme. On the one hand, a buck mode power converter may be configured to generate an output voltage which is reduced with regard to the input voltage according to a chosen duty cycle. At the same time, the buck mode power converter may be configured to generate an output current which is increased with regard to the input current according to a chosen duty cycle. On the one hand, a boost mode power converter, may be configured generate an output voltage which is increased with regard to the input voltage according to a chosen duty cycle. At the same time, the boost mode power converter may be configured to generate an output current which is reduced with regard to the input current according to a chosen duty cycle.

The duty cycle may be implemented using duty cycle signals which are applied to switching elements of the power converter. In this document, the duty cycle signals may denote the (binary) control signals which are applied to the high side switching elements and low side switching elements of the power converter in order to open or close said switching elements. More specifically, the duty cycle signals may denote the control signals which are applied to the gates of the high side transistors and low side transistors of the power converter. Hence, the duty cycle may be seen as an average value of the duty cycle signals applied to the switching elements.

The power converter may comprise a first integrator coupled between the first chopping unit and said comparator unit, wherein said first integrator is configured to determine an averaged voltage value based on said chopped voltage signal. For example, the first integrator may comprise a first low pass filter. The first low pass filter may comprise a first resistor coupled between the output of the first chopping unit and an output of said first low pass filter. Moreover, the first low pass filter may comprise a first capacitor coupled between the input of the power converter and the output of said first low pass filter. The output of said first low pass filter may then be connected to said comparator unit.

Alternatively or additionally, the first integrator may comprise an integrate-and-dump circuit.

The first chopping unit may comprise a first switching element connected between the input of said inductor and the output of the first chopping unit, and a second switching element connected between the input of said power converter and the output of the first chopping unit. Both the first switching element and the second switching element may be configured to switch based on the duty cycle of the power converter. Again, the first switching element and the second switching element may be any suitable transistors, such as, for example, MOSFETs, IGBTs, MOS-gated thyristors, or other suitable power devices.

The power converter may be a boost mode power converter, comprising a high side switching element coupled between the output of the power converter and an output of the inductor, and a low side switching element coupled between the output of the inductor and ground. The high side switching element and the low side switching element may be any suitable transistors, such as, for example, MOSFETs, IGBTs, MOS-gated thyristors, or other suitable power devices. The power converter may be configured to switch the first switching element in synchronism with the high side switching element. In other words, first switching element may be open whenever the high side switching element is open, and the first switching element may be closed whenever the high side switching element is closed. To this end, the duty cycle signal for controlling the high side switching element may be used for controlling the first switching element of the first chopping unit. Furthermore, the power converter may be configured to switch the second switching element in synchronism with the low side switching element. To this end, the duty cycle signal for controlling the low side switching element may be applied for controlling the second switching element of the first chopping unit Throughout this document, the term "ground" is meant in its broadest possible sense. In particular, ground is not limited to a node with a direct physical connection to earth. Rather, the term "ground" may refer to any reference point to which and from which electrical currents may flow or from which voltages may be measured. Moreover, it should be mentioned that the grounds mentioned in this document may not necessarily refer to the same physical contact. Instead, the grounds mentioned in this document may related to different physical contacts although reference is made to "ground" for ease of presentation.

The first chopping unit may be configured to sense the inductor voltage at the input of said inductor during time intervals when the high side power switch is closed. In particular, the first chopping unit may be configured to sense the inductor voltage at the input of said inductor only during time intervals when the high side power switch is closed, and not during time intervals when the high side power switch is open. During time intervals when the high side power switch is open, the first chopping unit may be configured to sense an input voltage at the input of the power converter. Thus, when the inductor voltage is averaged over time using the first low pass filter, the resulting averaged inductor voltage may be indicative of the output current of the power converter passing through that high side power switch. In this way, it becomes possible to determine an estimate for the output current by sensing the input current through said resistive element, wherein the determined estimate is independent of the duty cycle of the power converter.

In more detail, the averaged voltage at the output of the first low pass filter may be indicative of the input current. At the same time, a reference voltage VREF may be chopped with the same duty cycle. Thereby, a reference voltage that is indicative of the average input current that can be expected for a target output current at a given duty cycle may be created. By comparing the reference voltage to the averaged voltage, the comparator may trip at the desired output current.

As already mentioned, the power converter may be a buck mode power converter. The resistive element may be a high side switching element of said buck mode power converter. The replica resistive element may be a switching element configured to connect the input of the power converter to the reference potential or to isolate the reference potential from the input of the power converter. The latter switching element may be any suitable transistor, such as, for example, a MOSFET, an IGBT, a MOS-gated thyristors, or another suitable power device. The power converter may further comprise a low side switching element coupled between the input of the inductor and ground. The power converter may be configured to switch the replica resistive element in synchronism with the high side switching element. The power converter may be configured to switch the first switching element in synchronism with the high side switching element. Further, the power converter may be configured to switch the second switching element in synchronism with the low side switching element.

Put in a different way, the buck mode power converter may be configured to sense the inductor voltage at the input of said inductor during time intervals when the high side power switch is closed and, thus, during time intervals when the input current is actually equal to the output current of the power converter.

The power converter may comprise a third switching element connected between the input of the power converter and the reference potential, wherein the power converter may be configured to switch the third switching element in synchronism with the low side switching element. The third switching element may be any suitable transistor, such as, for example, a MOSFET, an IGBT, a MOS-gated thyristors, or another suitable power device. The third switching element may also be regarded as a second chopping unit for chopping said reference potential, i.e. for forcing said reference potential to be equal to the input voltage at the input of the power converter when said third switching element is closed.

The power converter may comprise a second integrator coupled between the reference potential and said comparator unit, wherein said second integrator is configured to determine an averaged voltage value based on said reference potential. Again, the second integrator may comprise a second low pass filter or an integrate-and-dump circuit. The second low pass filter may comprise a second resistor coupled between the reference potential and an output of said second low pass filter. Furthermore, the second low pass filter may comprise a second capacitor coupled between the input of the power converter and the output of said second low pass filter. The output of said second low pass filter may then be connected to said comparator unit.

The power converter may also be a buck-boost mode power converter. The resistive element may be the buck high side switching element of the power converter. The replica resistive element may be a switching element configured to connect the input of the power converter to the reference potential or to isolate the reference potential from the input of the power converter. The power converter may further comprise a low side buck switching element coupled between the input of the inductor and ground. The power converter may further comprise a high side boost switching element coupled between the output of the power converter and an output of the inductor. The power converter may further comprise a low side boost switching element coupled between the output of the inductor and ground. The power converter may be configured to switch the replica resistive element in synchronism with the high side buck switching element. The power converter may be configured to switch the first switching element in synchronism with the high side boost switching element. The power converter may be configured to switch the second switching element in synchronism with the low side boost switching element.

The power converter may further comprise a third switching element connected between the input of the power converter and the reference potential, wherein the power converter may be configured to switch the third switching element in synchronism with the high side buck switching element.

The power converter may further comprise a second integrator coupled between the reference potential and said comparator unit, wherein said second integrator may be configured to determine an averaged voltage value based on said reference potential.

The power converter may further comprise at least one integrate-and-dump circuit. The power converter may be configured to determine a first estimate for an output current of the power converter during a first time interval using the at least one integrate-and-dump circuit. The power converter may be configured to determine a second estimate for the output current of the power converter during a second time interval using the at least one integrate-and-dump circuit. The power converter may be configured to determine a third estimate for the output current of the power converter during a third time interval based on a voltage, indicative of an inductor current, sampled at a first time during the first time interval and based on a voltage, indicative of an inductor current, sampled at a second time during the second time interval. For example, the first time may be the starting time of the first time interval and the second time may be the end time of the second time interval, and the third estimate may be obtained by averaging the inductor voltage at the first time and at the second time. The power converter may be configured to determine a sum or an average value for the output current for the first, the second, and the third time interval by averaging the first, the second, and the third estimate for the output current.

In the above, the samples may be taken at the end of one period where the current is observable (first time period) and at the beginning of the next period that is again observable (second time period). These two intervals subtend the interval where the current is not directly observable (third time interval), and the samples (estimates) from the first two periods may be used for obtaining the estimate for the third period.

According to another aspect, a method for detecting a light load condition at an output of a power converter is described. The method may comprise steps which correspond to the features of the power converter described in the present document. In particular, the method steps may be tailored for a power converter comprising an inductor, a resistive element connected between an input of the power converter and an input of the inductor, a replica resistive element coupled between the input of the power converter and a reference potential, and a reference current source, wherein said reference current source and said replica resistive element are arranged in series. The method may comprise generating, by a first chopping unit, a chopped voltage signal at an output of said first chopping unit, wherein the chopped voltage signal is generated by chopping an inductor voltage at the input of said inductor based on a duty cycle of the power converter. The method may comprise generating a signal indicative of said light load condition based on the reference potential and based on the chopped voltage signal.

The method may comprise determining an averaged voltage value based on said chopped voltage signal using a first integrator coupled between the first chopping unit and said comparator unit.

The first chopping unit may comprise a first switching element connected between the input of said inductor and the output of the first chopping unit, and a second switching element connected between the input of said power converter and the output of the first chopping unit. In this scenario, the method may comprise switching both the first switching element and the second switching element based on the duty cycle of the power converter.

The power converter may be a boost mode power converter comprising a high side switching element coupled between the output of the power converter and an output of the inductor, and a low side switching element coupled between the output of the inductor and ground. For such a power converter, the method may comprise switching the first switching element in synchronism with the high side switching element. Further, the method may comprise switching the second switching element in synchronism with the low side switching element.

Alternatively, the power converter may be a buck mode power converter, the resistive element may be a high side switching element of the power converter, the replica resistive element may be a switching element configured to connect the input of the power converter to the reference potential or to isolate the reference potential from the input of the power converter, and the power converter may further comprise a low side switching element coupled between the input of the inductor and ground. For such a buck mode power converter, the method may comprise switching the replica resistive element in synchronism with the high side switching element, switching the first switching element in synchronism with the high side switching element, and switching the second switching element in synchronism with the low side switching element.

If the power converter comprises a third switching element connected between the input of the power converter and the reference potential, the method may further comprise switching the third switching element in synchronism with the low side switching element. The method may comprise determining, using a second integrator, an averaged voltage value based on said reference potential.

The power converter may be a buck-boost mode power converter, the resistive element may be a buck high side switching element of the power converter, the replica resistive element may be a switching element configured to connect the input of the power converter to the reference potential or to isolate the reference potential from the input of the power converter, and the power converter may further comprise a low side buck switching element coupled between the input of the inductor and ground. The power converter may further comprise a high side boost switching element coupled between the output of the power converter and an output of the inductor. The power converter may further comprise a low side boost switching element coupled between the output of the inductor and ground. The method may comprise switching the replica resistive element in synchronism with the high side buck switching element, switching the first switching element in synchronism with the high side boost switching element, and switching the second switching element in synchronism with the low side boost switching element.

If the power converter further comprises a third switching element connected between the input of the power converter and the reference potential, the method may further comprise switching the third switching element in synchronism with the high side buck switching element.

The method may comprise determining, using a second integrator, an averaged voltage value based on said reference potential.

The method may comprise determining a first estimate for an output current of the power converter during a first time interval using at least one integrate-and-dump circuit, determining a second estimate for the output current of the power converter during a second time interval using the at least one integrate-and-dump circuit, and determining a third estimate for the output current of the power converter during a third time interval based on a voltage, indicative of an inductor current, sampled at a first time during the first time interval and based on a voltage, indicative of an inductor current, sampled at a second time during the second time interval. The first time may be the starting time of the first time interval and the second time may be the end time of the second time interval, and the third estimate may be obtained by averaging the inductor voltage at the first time and at the second time. The method may comprise determining a sum or an average value for the output current for the first, the second, and the third time interval by averaging the first, the second, and the third estimate for the output current.

According to a further aspect, a software program is described. The software program may be adapted for execution on a processor and for performing the method steps outlined in the present document when carried out by the processor.

In particular, the software program may be adapted for execution on a processor which controls the switching behaviour of at least some of the switching elements (transistors) of the described power converter.

According to another aspect, a storage medium is described. The storage medium may comprise a software program adapted for execution on a processor and for performing the method steps outlined in the present document when carried out by the processor.

According to a further aspect, a computer program product is described. The computer program product may comprise instructions for performing the method steps outlined in the present document when carried out by the processor.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which

FIGS. 9A, 9B, 9C and 9D show exemplary circuits for using an integrate-and-dump architecture on a trapezoidal inductor current where the inductor current is not available during one of three segments; and FIGS. 10A and 10B show simulation results demonstrating the performance of using integrate-and-dump circuits when the third portion of the duty cycle is not measurable.

DESCRIPTION

Figure 1:
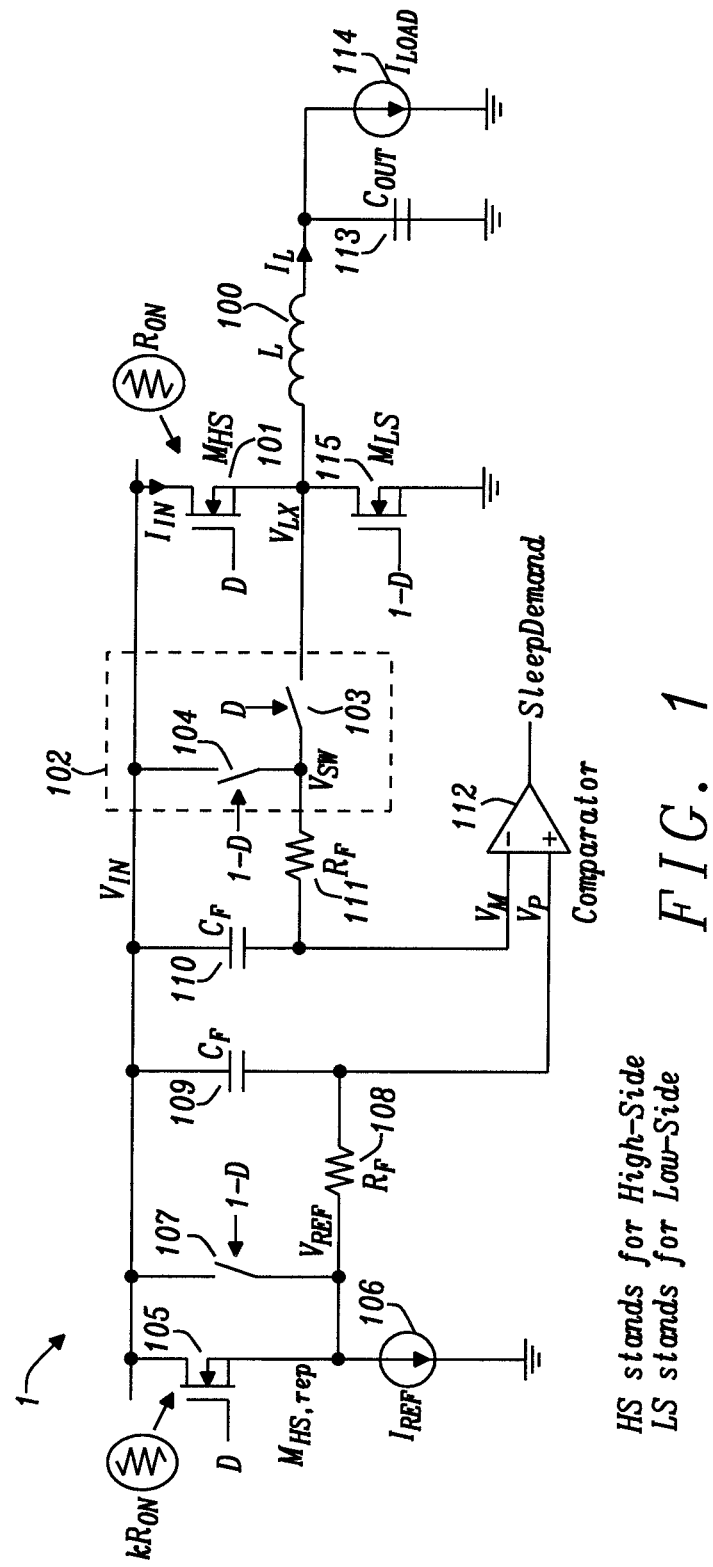
FIG. 1 shows an exemplary buck mode power converter and a detection scheme.

FIG. 1 shows an exemplary buck mode power converter 1 which is useful for understanding the present invention. The exemplary buck mode power converter 1 is configured to detect a light load condition at an output of the power converter 1. The exemplary buck mode power converter 1 comprises an inductor 100 and a resistive element 101 connected between an input of the power converter and an input of the inductor. In the illustrated buck converter 1, the resistive element 101 is actually the high side switching element of the buck converter which is used as a current sensing means.

The buck converter 1 further comprises a first chopping unit 102 configured to generate a chopped voltage signal at an output of said first chopping unit, wherein the chopped voltage signal is generated by chopping an inductor voltage at the input of said inductor 100 based on a duty cycle of the buck converter 1. The first chopping unit 102 comprises a first switching element 103 and a second switching element 104. Moreover, power converter 1 comprises a low side switching element 115, a replica resistive element 105, a reference current source 106, a third switching element 107, a first resistor 108, a first capacitor 109, a second capacitor 110, a second resistor 111, and a comparator 112. In addition, an optional output capacitor 113 and a load 114 are illustrated at the output of the buck converter 1.

Figure 2:
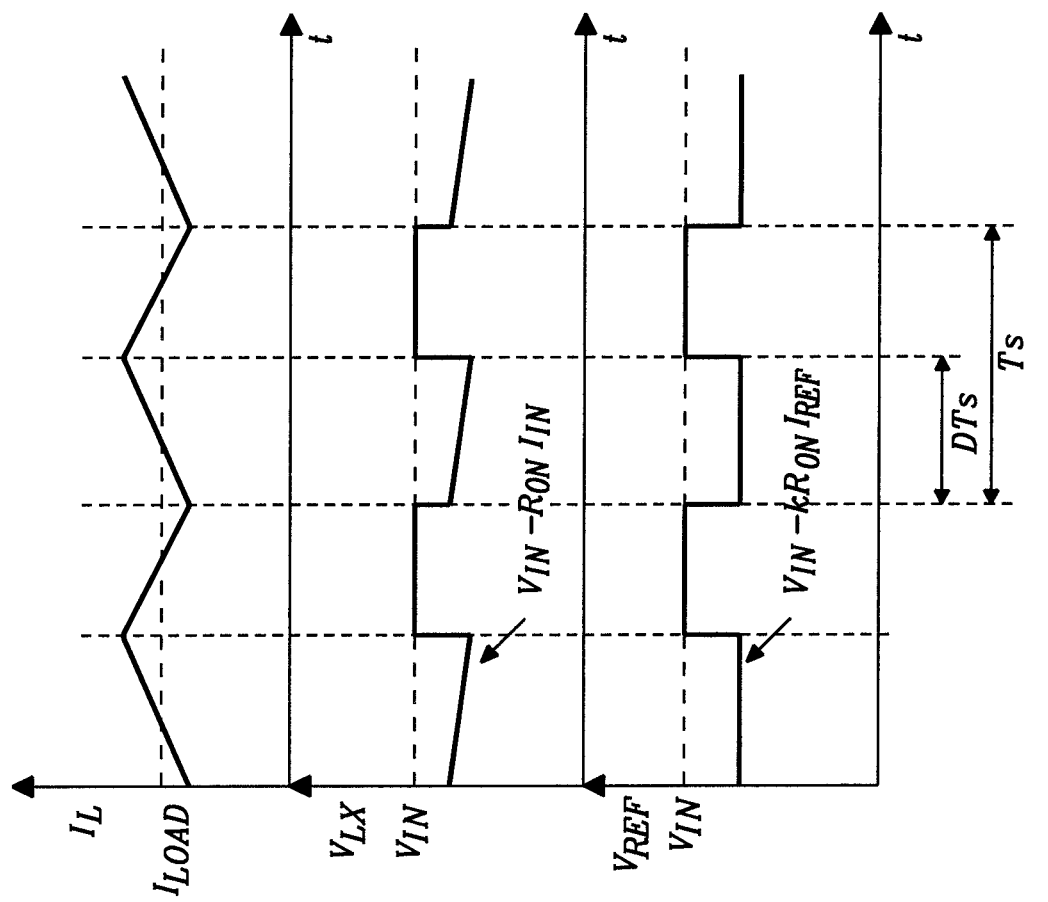
FIG. 2 shows waveforms in an exemplary buck mode power converter.

FIG. 2 shows a detection scheme and waveforms in the exemplary buck mode power converter of FIG. 1. In the following description, the operating principle of the proposed invention in buck mode is described in an exemplary, non-limiting manner.

The current through FET 101 (resistive element) of the buck converter, namely $M_{HS}$ (HS stands for High-Side), is sensed while a load current equal to $I_{LOAD}$ is applied at the output. The sensed current, denoted as $I_{IN}$, is a portion of the inductor current $I_L$, that is $$I_{IN}=I_L \text{ during time interval } [0,DT_S], \text{ and}$$

$$I_{IN}=0 \text{ during time interval } [DT_S,T_S].$$

D is the buck duty cycle and $T_S$ is the switching period.
During time interval [0, $DT_S$], $V_{LX}=V_{IN} R_{ON}I_L$, where $R_{ON}$ is the on resistance of $M_{HS}$.
During time interval [$DT_S$, $T_S$], $V_{LX}=V_{IN}$.
Using a switch network driven by the duty-cycle, its output $V_{SW}$ can be written as $$V_{SW}=V_{IN}-R_{ON}I_L \text{ during } [0,DT_S] \text{ and}$$

$$V_{SW}=V_{IN} \text{ during } [DT_S,T_S]$$

After averaging through filter $R_FC_F$, a voltage equal to $V_M=V_{IN}-DR_{ON}I_L$ is generated. It is worth noting that $R_FC_F>T_S$ so that the switching ripple of $V_{LX}$ is filtered out.

During time interval [0, $DT_S$], current reference $I_{REF}$ is sunk from replica device $M_{HS,rep}$, whose on resistance is $kR_{ON}$. k is the sensing ratio between $M_{HS}$ and $M_{HS,rep}$. During time interval [$DT_S$, $T_S$], $I_{REF}$ is dumped to the supply $V_{IN}$ through a low-ohmic switch. Averaging through filter $R_FC_F$, an average voltage equal to $$V_P=V_{IN}-kDR_{ON}I_{REF}$$

is thus generated. It is worth noting that $R_FC_F>T_S$ so that the switching ripple of $V_{REF}$ is filtered out.

When $V_M$ gets close than $V_P$, the output of the comparator toggles high. Therefore, signal SleepDemand goes high when $V_P=V_M$, that is $$V_P-kDR_{ON}I_{REF}=V_{IN}-DR_{ON}I_L.$$

Accordingly, $$kI_{REF}=I_L.$$

Since in a buck converter, $I_L=I_{OUT}$, we get $$kI_{REF}=I_{OUT}.$$

This means that signal SleepDemand toggles when $I_{OUT}$ is equal to a threshold equal to $kI_{REF}$. The concept of $DI_{REF}$ is used in the exemplary solution to detect when the load current $I_{LOAD}$ has reached a threshold equal to $kI_{REF}$. If $I_{LOAD}<kI_{REF}$, the output of the comparator SleepDemand is high. In this case, the converter operates e.g. in PFM mode.

If $I_{LOAD}>kI_{REF}$, SleepDemand is low. In this case, the converter operates e.g. in CCM mode. The purpose of SleepDemand may be to monitor the load current. It may also be used to regulate the power converter.

Figure 3:
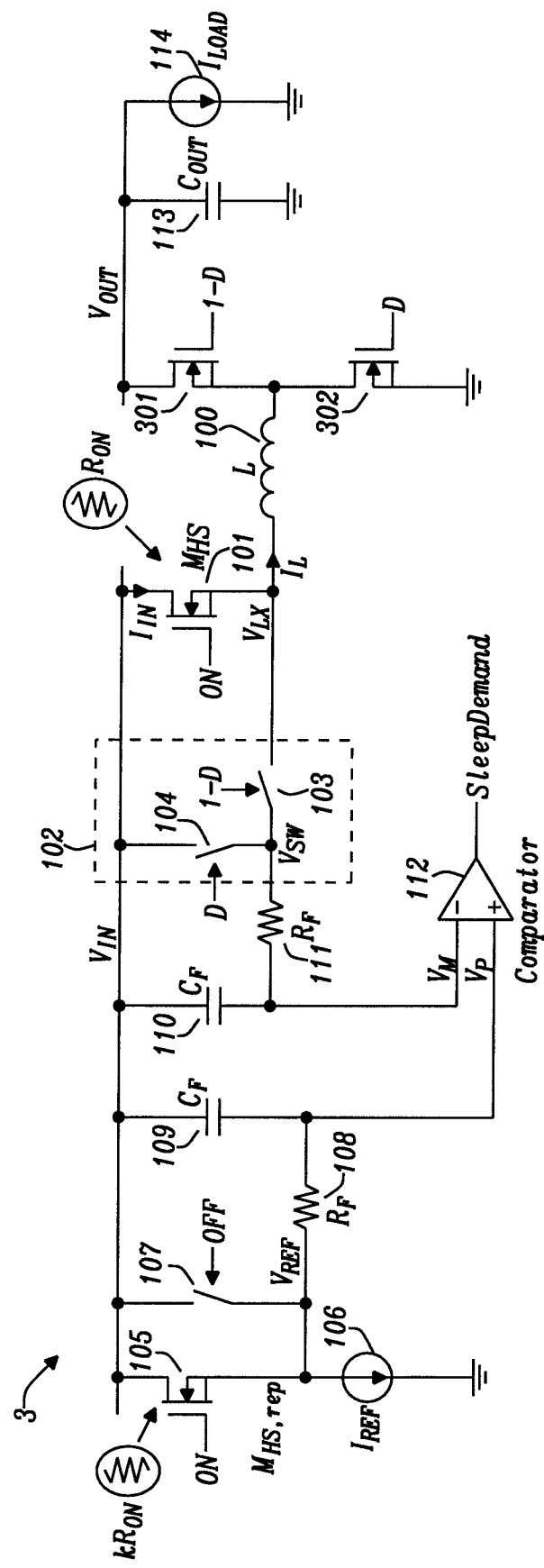
FIG. 3 shows an exemplary boost mode power converter and a detection scheme.

FIG. 3 shows an exemplary boost mode power converter 3 which is useful for understanding the present invention. A main difference between the boost converter 3 and the buck converter 1 is that the boost converter 3 comprises a high side switching element 301 at the output of the inductor 100. Moreover, boost converter 3 comprises a low side switching element 302 at the output of the inductor 100. The resistive element 101 which servers a current sensor is always turned on in this embodiment. Although a transistor is shown in FIG. 3 to illustrate resistive element 101, the skilled person will readily understand that, in an alternative embodiment, said transistor which is always turned on and, thus, may be replaced by a simple shunt resistor.

Figure 4:
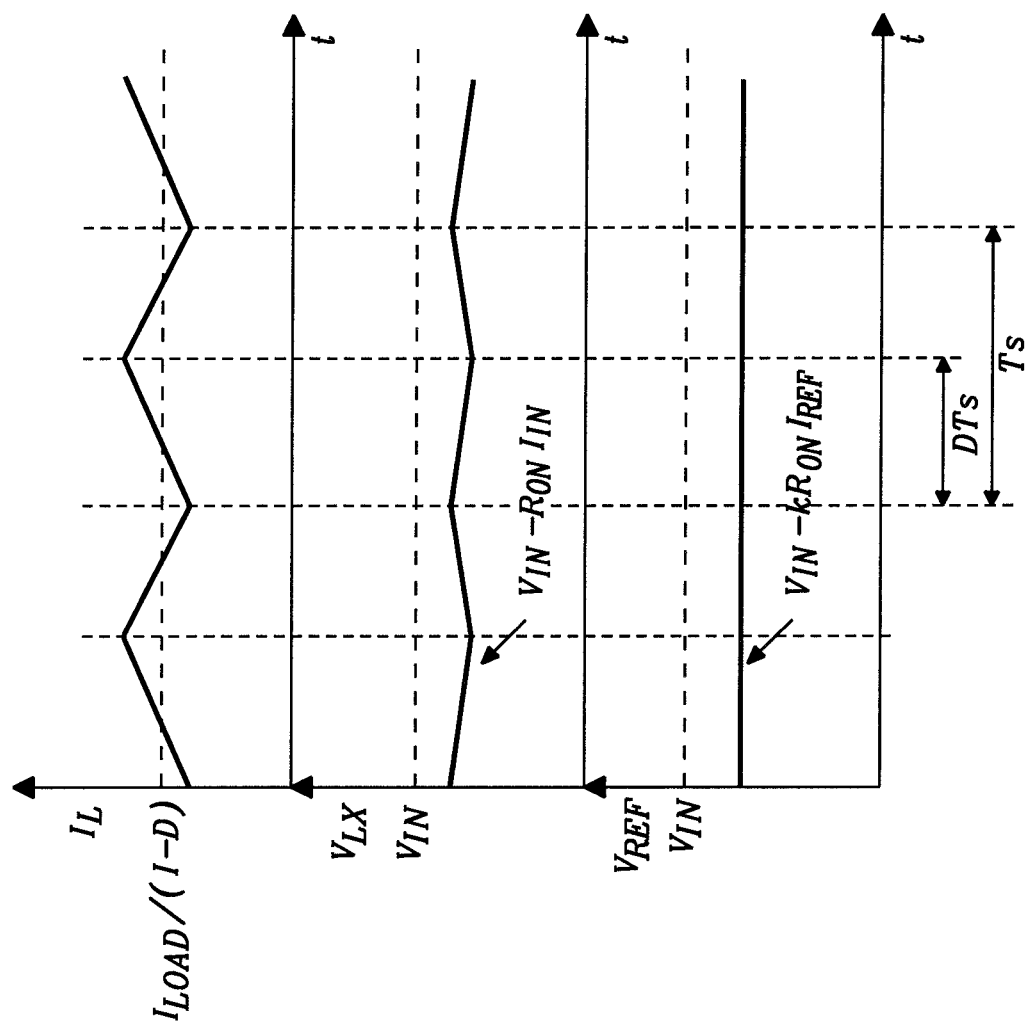
FIG. 4 shows waveforms in an exemplary boost mode power converter.

FIG. 4 shows a detection scheme and waveforms in the exemplary boost mode power converter 3 of FIG. 3. The operating principle of the proposed invention in boost mode can be described as follows.

The current through the resistive element 101, namely $M_{HS}$ (HS stands for High-Side), is sensed while a load current equal to $I_{LOAD}$ is applied at the output. The sensed current, denoted as $I_{IN}$, is equal to the inductor current $I_L$, that is $I_{IN}=I_L$ during time interval [0, $DT_S$] and during time interval [$DT_S$, $T_S$]. D is the boost duty cycle and $T_S$ is the switching period.

During time interval [0, $T_S$], switching node voltage $V_{IA}$ is $V_{IN} R_{ON}I_{IN}$, where $R_{ON}$ is the on resistance of $M_{HS}$. Using a switch network driven by the duty-cycle, its output $V_{SW}$ can be written as $$V_{SW}=V_{IN} \text{ during } [0,DT_S] \text{ and}$$

$$V_{SW}=V_{IN}-R_{ON}I_{IN} \text{ during } [DT_S,T_S]$$

After averaging through filter $R_FC_F$, a voltage equal to $V_M=V_{IN}-(1-D)R_{ON}I_{IN}$ is generated. It is worth noting that $R_FC_F>T_S$ so that the switching ripple of $V_{LX}$ is filtered out.

During time interval [0, $T_S$], current reference $I_{REF}$ is sunk from replica device $M_{HS,rep}$ whose on resistance is $kR_{ON}$. k is the sensing ratio between $M_{HS}$ and $M_{HS,rep}$. $V_{REF}$ is hence equal to $V_{IN}-kR_{ON}I_{REF}$.

Averaging through filter $R_FC_F$, an average voltage equal to $V_F=V_{IN}-kR_{ON}I_{REF}$ is generated. It is worth noting that $R_FC_F>T_S$ so that the switching ripple of $V_{REF}$ is filtered out.

When $V_M$ gets close than $V_F$, the output of the comparator toggles high. Therefore, signal SleepDemand goes high when $V_F=V_M$, that is $$V_{IN}-kR_{ON}I_{REF}=V_{IN}-(1-D)R_{ON}I_{IN}.$$

Accordingly, $$kI_{REF}=(1-D)I_{IN}.$$

Since in a boost converter $I_{IN}=I_{OUT}/(1-D)$, we can write $$kI_{REF}=I_{OUT}.$$

This means that signal SleepDemand toggles when $I_{OUT}$ is equal to a threshold equal to $kI_{REF}$.

Figure 5A:
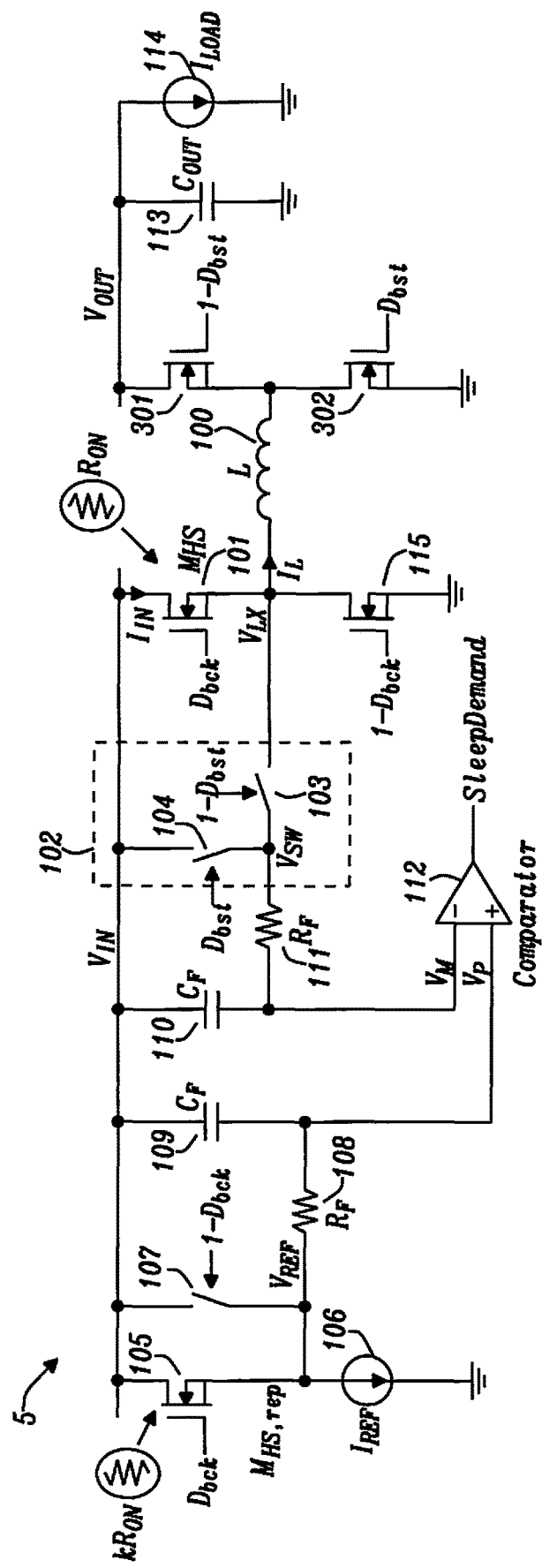
FIG. 5A shows an exemplary buck-boost mode power converter and a detection scheme.
Figure 6:
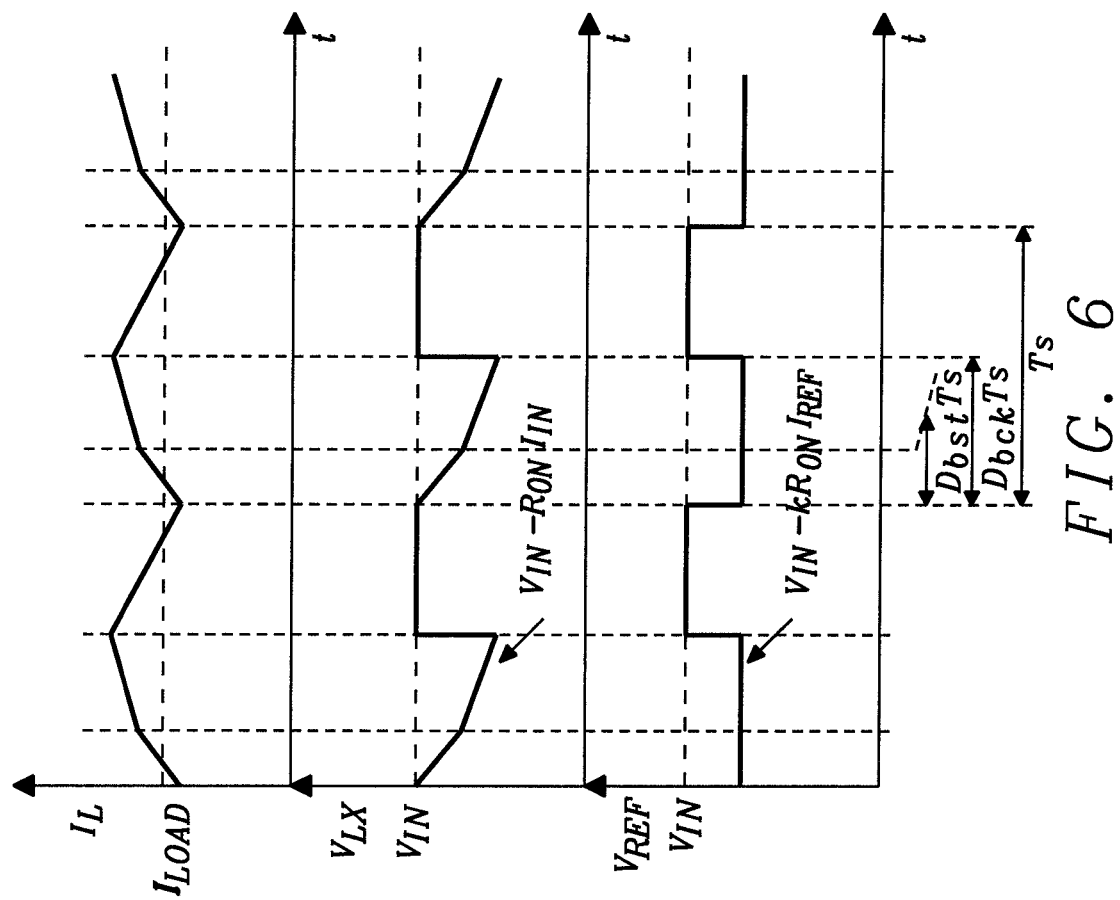
FIG. 6 shows waveforms in an exemplary buck-boost mode power converter.

FIG. 5A shows an exemplary buck-boost mode power converter 5 which is useful for understanding the present invention. FIG. 6 shows a detection scheme and waveforms in the exemplary buck-boost mode power converter 5 shown in FIG. 5A.

The operating principle of the proposed invention in buck-boost mode can be described as follows:

The current through the resistive element 101 (which is the high-side FET of the buck converter in this case), namely $M_{HS}$ (HS stands for High-Side), is sensed while a load current equal to $I_{LOAD}$ is applied at the output. The sensed current, denoted as $I_{IN}$, is a portion of the inductor current $I_L$, that is $I_{IN}=I_L$ during time interval [0, $D_{bck}T_S$], and $I_{IN}=0$ during time interval $[D_{bck}T_S, T_S]$. $D_{bck}$ is the buck duty cycle and $T_S$ is the switching period. A portion of the inductor current flows to the output of the converter during interval $[D_{bst}T_S, T_S]$.

During time interval $[0, D_{bck}T_S]$, $V_{LX}=V_{IN}R_{ON}I_L$, where $R_{ON}$ is the on resistance of $M_{HS}$. Using a switch network driven by duty-cycle $D_{bst}$, its output $V_{SW}$ can be written as $$V_{SW}=V_{IN} \text{ during } [0,D_{bst}T_S] \text{ and}$$

$$V_{SW}=V_{IN}-R_{ON}I_{IN} \text{ during } [D_{bst}T_S,T_S]$$

After averaging through filter $R_F C_F$, a voltage equal to $V_M = V_{IN}-(1-D_{bst})R_{ON}I_{IN}$ is generated. It is worth noting that $R_F C_F > T_S$ so that the switching ripple of $V_{LX}$ is filtered out.

During time interval $[0, D_{bck}T_S]$, current reference $I_{REF}$ is sunk from replica device $M_{HS,rep}$, whose on resistance is $kR_{ON}$. k is the sensing ratio between $M_{RS}$ and $M_{HS,rep}$. During time interval $[D_{bck}T_S, T_S]$, $I_{REF}$ is dumped to the supply $V_{IN}$ through a low-ohmic switch.

Averaging through filter $R_F C_F$, an average voltage equal to $V_P=V_{IN}-kD_{bck}R_{ON}I_{REF}$ is generated. It is worth noting that $R_F C_F > T_S$ so that the switching ripple of $V_{REF}$ is filtered out.

When $V_M$ gets close than $V_P$, the output of the comparator toggles high. Therefore, signal SleepDemand goes high when $V_P=V_M$, that is $$V_{IN}-kD_{bck}R_{ON}I_{REF}=V_{IN}-(1-D_{bst})R_{ON}I_{IN}.$$

Accordingly, $$kI_{REF}=(1-D_{bst})/D_{bck}I_{IN}.$$

Since in a buck-boost converter, $$I_{IN}=I_{OUT}D_{bck}/(1-D_{bst})$$

we get $$kI_{REF}=I_{OUT}.$$

This means that signal SleepDemand toggles when $I_{OUT}$ is equal to a threshold equal to $kI_{REF}$.

Figure 5B:
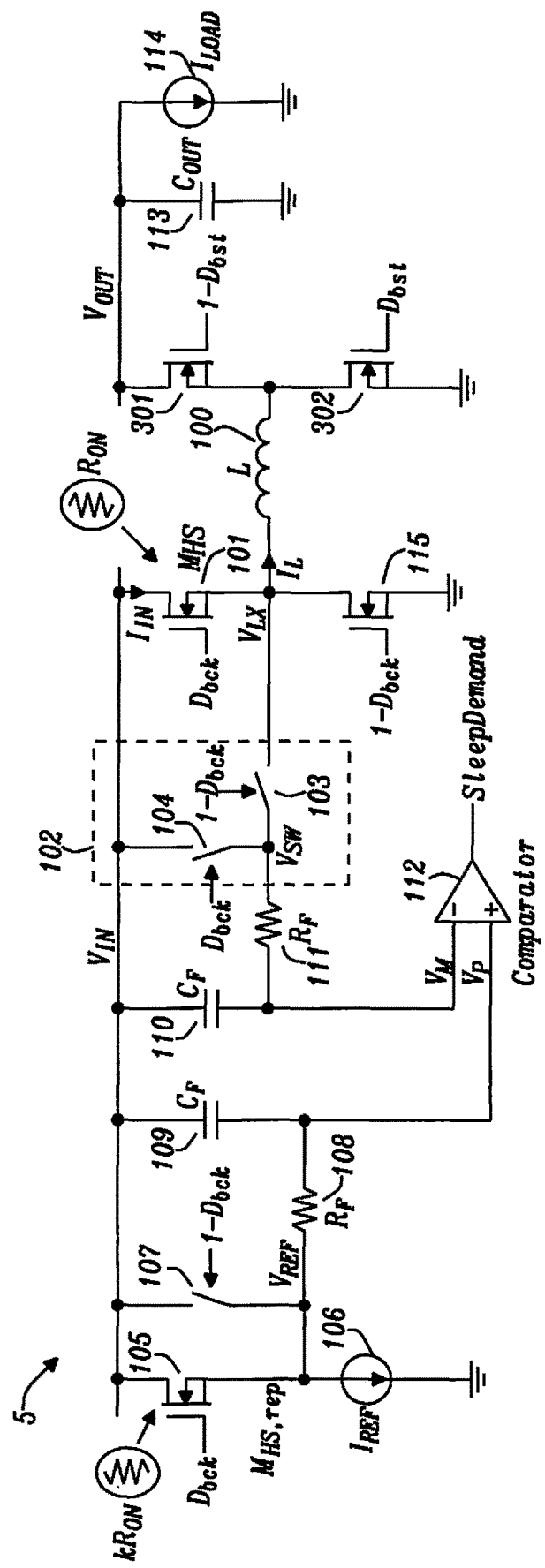
FIG. 5B shows an exemplary buck-boost mode power converter and a detection scheme with an alternative chopping scheme for detecting coil current rather than output current.

FIG. 5B shows an exemplary buck-boost mode power converter 5 with an alternative chopping scheme arrangement to allow detecting a light load condition based on a predefined coil current rather than output current. This can be advantageous for control schemes where the boundary between discontinuous conduction mode (DCM) and continuous current mode (CCM) operation is better defined in terms of coil current rather than output current.

An example is DCM operation where a fixed peak coil current limit is used. The current capability in DCM in such an example is better defined in terms of coil current than output current.

$$I_{IN}=I_L/(1-D_{BUCK})$$

$D_{BUCK}$ is the buck duty cycle and $I_L$ is the coil current.

The same calculations as per the buck case (described in in the context of FIG. 2 above) apply and lead to the following formula:

$$kI_{REF}=I_L.$$

Figure 7:
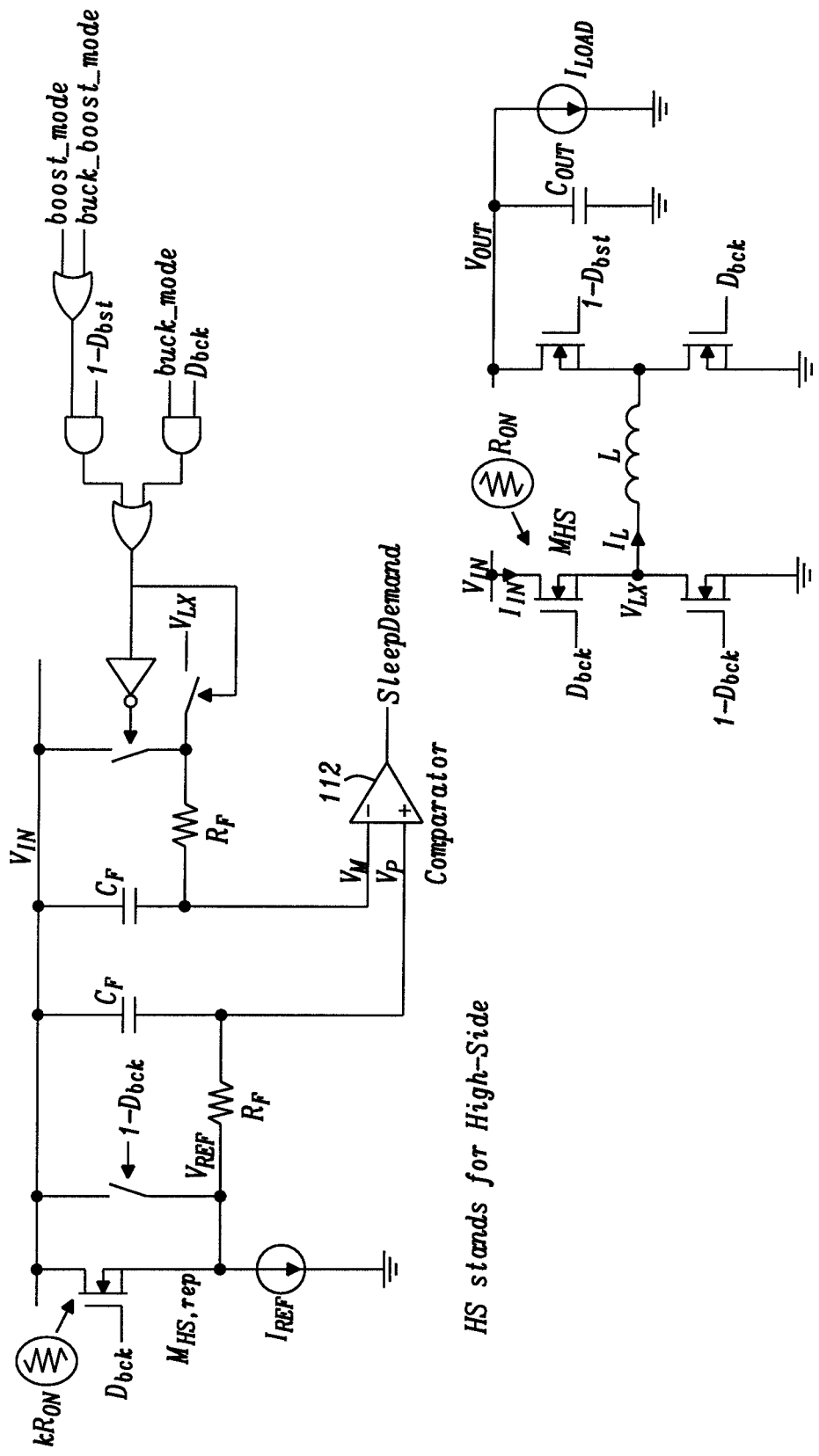
FIG. 7 shows an exemplary unified controller for buck, boost and buck-boost mode.

FIG. 7 shows an exemplary unified controller for buck, boost and buck-boost mode. The illustrated monitoring scheme has been generalized to a buck-boost converter. When the converter is configured as a buck converter, Dbst is permanently low, and buck_mode=ON, boost mode=OFF and buck_boost_mode=OFF. Accordingly, the circuit in FIG. 7 reduces to the circuit in FIG. 1. When the converter is configured as a boost converter, Dbck is permanently high, and buck_mode=OFF, boost_mode=ON and buck_boost_mode=OFF. Accordingly, the circuit in FIG. 7 reduces to the circuit in FIG. 3. When the converter is configured as a buck-boost converter, buck_mode=OFF, boost_mode=OFF and buck_boost_mode=ON. Accordingly, the circuit in FIG. 7 reduces to the circuit in FIG. 5.

A further enhancement is related to the current averaging by replacing the low pass filter with an integrate-and-dump scheme. If that scheme is utilized over a period, the output is (1) updated every cycle and can thus be used for switching updates, (2) will have more bandwidth because a low pass filter is not needed for ripple attenuation but is only used for compensation, and (3) a higher bandwidth can be used in the system. The concept of integrated-and-dump is yet another embodiment that can be used to increase accuracy. Furthermore, in the buck-boost case where (1) the inductor current is trapezoidal in nature instead of triangular, and (2) the inductor current is not available in one of the three sections of the trapezoidal waveforms, one may still obtain an accurate integrate-and-dump from the circuit so that the benefits described in this here can be had in the buck-boost mode as well as in the buck and boost modes.

Figure 8:
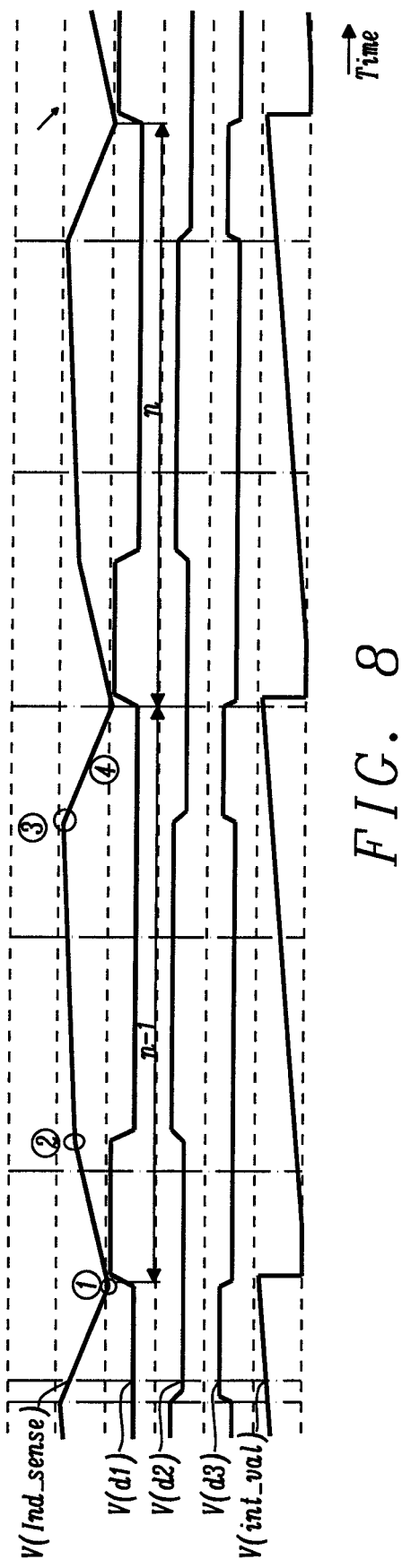
FIG. 8 shows exemplary waveforms resulting from usage of an integrate-and-dump architecture on a trapezoidal inductor current where the inductor current is not available during one of three segments.
Figure 9C:
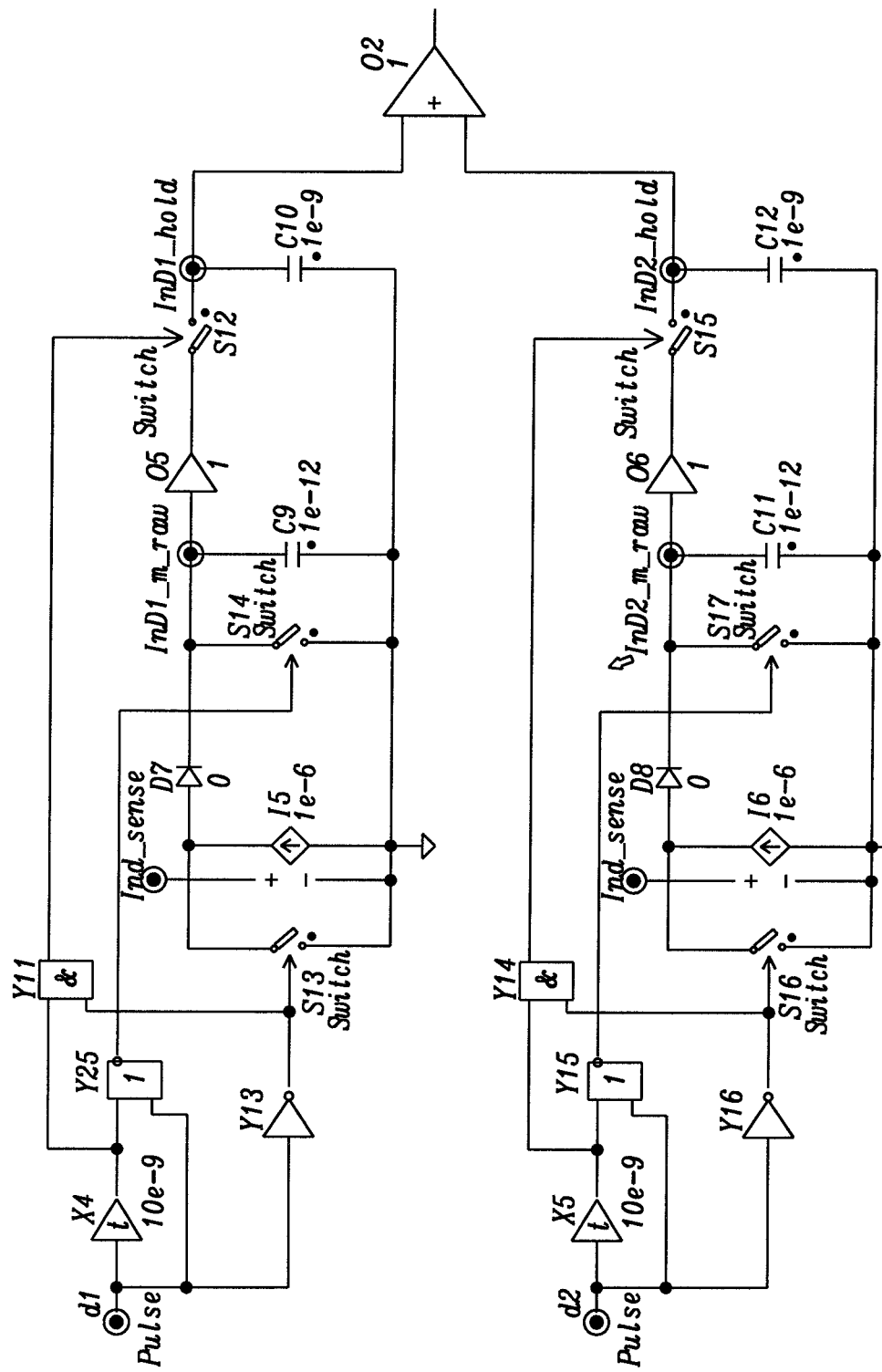
Figure 9D:
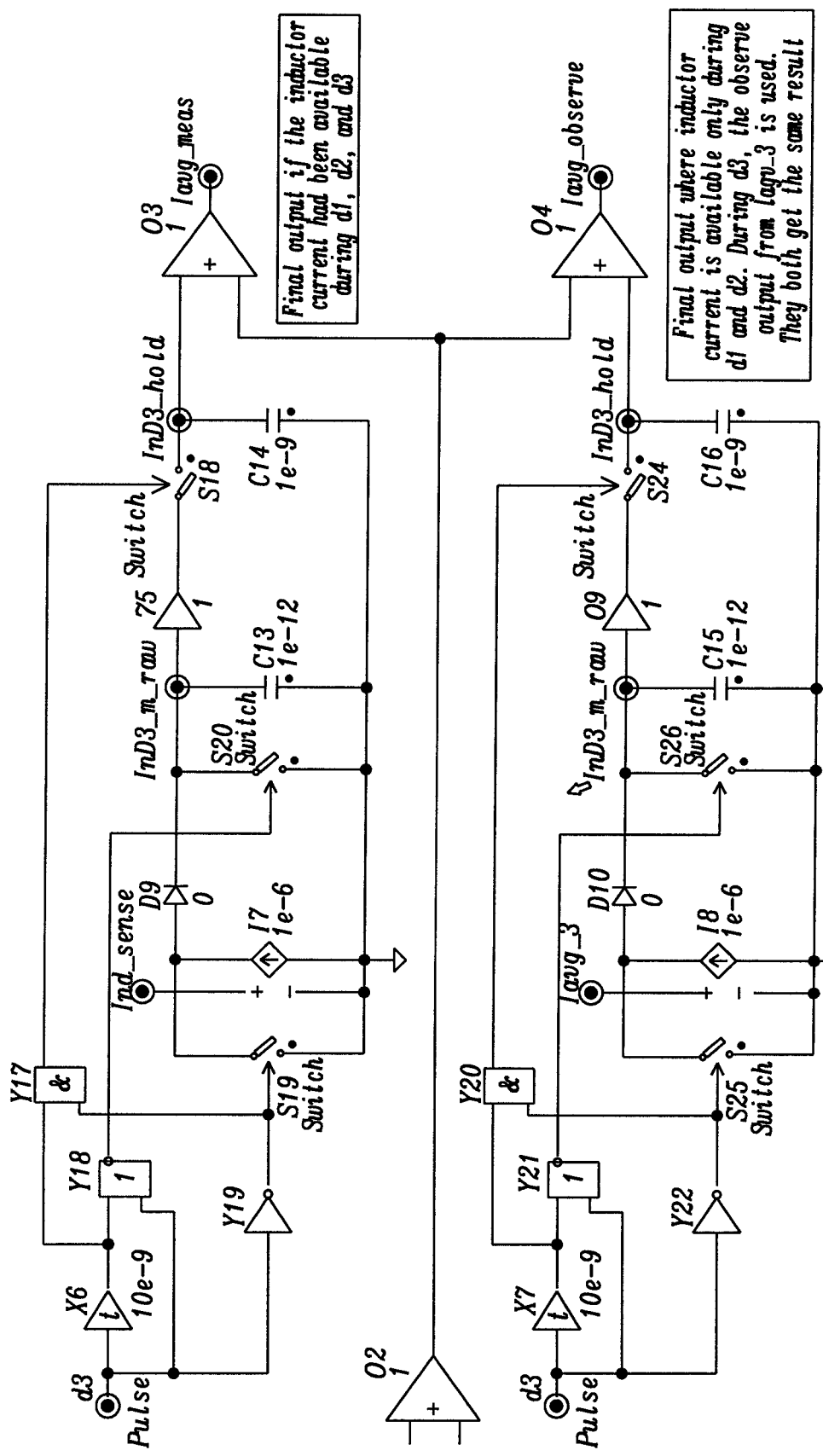

FIG. 8 shows exemplary waveforms resulting from usage of an integrate-and-dump architecture on a trapezoidal inductor current where the inductor current is not available during one of three segments. In FIG. 8, the signal denoted as V(Ind_sense) is a typical signal for the actual inductor current in a buck-boost architecture. Note that it does contain 3 slopes. The signals V(d1), V(d2), and V(d3) are the duty cycle pulses called d1, d2, and d3 which may be described by the following logical expressions based on the duty cycle signals $D_{bck}$ and $D_{bst}$:

$$d1=D_{bck} \& D_{bst}$$

$$d2=D_{bck} \& (1-D_{bst})$$

$$d3=(1-D_{bck}) \& (1-D_{bst})$$

There may be signals present from the controller that determine the switch events causing the trapezoidal inductor current. The signal V(int_val) may be the result of integrating and dumping the signal over a whole period. The integral divided by the time is the average current over the cycle. Note that in the FIG. 8 the 3 points in the waveform are circled and labelled with squares with the numbers 1, 2, and 3. For this discussion, we will assume that the inductor current IS available from point 1 to point 2, and from point 2 to point 3, but that it is not available from point 3 to what would be point 1 in the next cycle. The goal of the method is to use the data from points 1 and 3 in the "n–1" cycle (indicated by rectangular box below the left hand cycle) to estimate the average current for cycle "n" (also indicated by rectangular box below the right hand cycle). If we use a sample and hold to capture point 1 and 3, then the average current in that part of the waveform that is indicated by "d3" signal is d3_avg=(sample 1+sample 3)/2.0. Three integrate and dump (I&D) circuits can be used. This assumes that there are three sources for the inputs. A single I&D may also be used with a multiplexer at its input as well. The point however is that during the duty cycle where a sensor is not present, the input to the integrate-and-dump circuit can be the average that was calculated above as d3_avg. By doing this, a nearly accurate integrate and dump of the whole cycle can be obtained.

FIGS. 9A, 9B, 9C and 9D show exemplary circuits for using an integrate-and-dump architecture on a trapezoidal inductor current where the inductor current is not available during one of three segments. The circuits in FIGS. 9A, 9B, 9C and 9D are not all required for implementation, but they are provided here for explanation purposes. There are 10 blocks and they are described here. Block 1 is merely a signal generator that is used to test the method. It has a repeating piecewise linear (PWL) signal that is used to create the trapezoidal inductor current sensor output that would be found in the buck-boost mode of operation. Block 2 is just the composite signal output from block 1. Block 3 contains the duty cycle signals that are the cause of the corners of the trapezoidal inductor current shape. Block 4 is my not be part of the circuit; but is merely an ideal integrate-and-dump circuit that assumes that the inductor current is directly measurable from the same sensor during all of the duty cycle conditions. It is illustrated for comparison purposes to demonstrate that the same answer can be derived from the actual implementation. Block 5 is a pair of sample-and-hold circuits that captures the analog value of the sensor output at the appropriate times that are determined by the rising edges of d1 and d3. Block 6 is the simple averaging circuit that gives us the midpoint current sensor output for the current between points 3 (of n−1) and 1 (of n). Blocks 7, 8, and 9 are integrate-and-dump circuit designed to operate off of separate sensors for the d1, d2, and d3 periods as they occur. The outputs are summed together using the summer O2 and O3. As was mentioned before, this can all be a single integrate-and-dump circuit using multiplexed inputs. Also note that the simple logic cells on the left side of the integrate-and-dump circuit are for ensuring that the integrated value is saved, and then the integrator is reset to 0 for the next cycle. Block 10 together with blocks 6 and 5 form essential components of this solution. Block 10 is an integrate-and-dump circuit the input of which is driven by the summer O3 (block 6) which is the average of the points 3 (n−1) and 1 (n) which were produced with the sample-and-hold circuits of block 5. By using the "observer" integrate and dump of block 10, the final integrated value can still be pretty accurately be determined over a whole cycle. If the signal is steady state, then it can be theoretically exactly representative of the needed quantity. If the signal is changing, then the approximation will be less accurate, but still very useful for regulation.

Figure 10A:
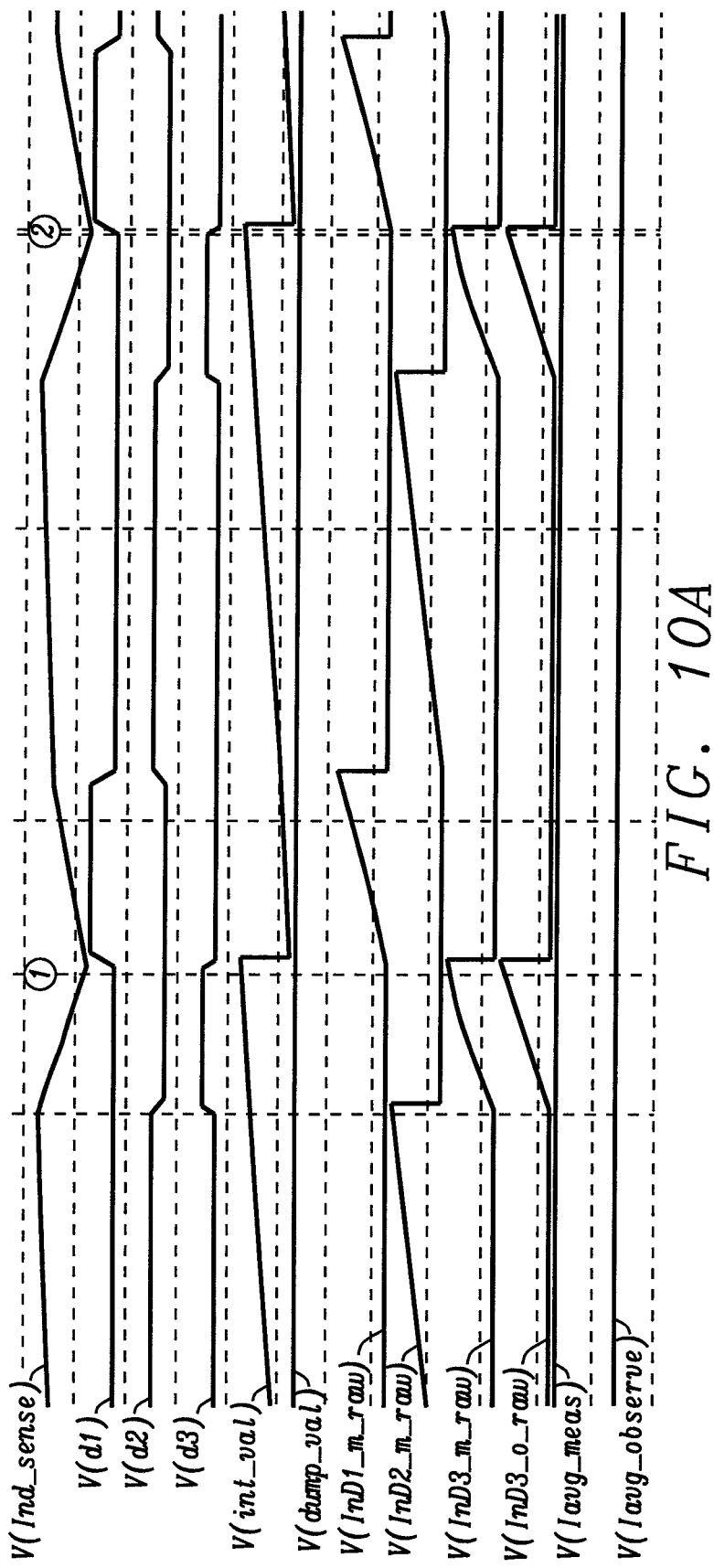

Another aspect of the integrate and dump method is that the time constant of the low pass filter may no longer be dictated by the requirement to reduce ripple; but moreover it may now be dictated by whatever compensation requirements might exist if the integrate and dump output is to be used in a real time regulation scheme. In the steady state mode, the output of Iavg_meas O3 is the same as the observer summed output O4 called Iavg observer. FIGS. 10A and 10B demonstrate the signals from the above schematic from simulation to demonstrate the operation. Specifically, FIGS. 10A and 10B show simulation results demonstrating the performance of using integrate-and-dump circuits when the third portion of the duty cycle is not measurable.

In FIG. 10B, the top left circle highlights the output of the ideal integrator. Note that the sample period and the capacitors used in the integrators are designed so that the outputs do in fact represent the average current. This can be seen by observing the contents of the top right circle which is the actual measured average current between the two cursors which are positioned over a period of one cycle.

The bottom circle is the output of the two methods of integrate and dump from 3 sources. The signal called Iavg_meas is from O3 and is what one would get if one had all 3 sections of the inductor current captured by separate integrate-and-dump circuits and added. The Iavg observe is the output of O4 and is the output which is the result of the disclosed method. One can see the results are all very close.

In conclusion, the present invention may be applied to switching regulators such as buck, boost and buck-boost converters. The proposed circuits allow to detect when the output current of the converter crosses a threshold current by only sensing the input current. The duty-cycle is cancelled out thus allowing load current detection independent of the duty-cycle. This allows, in particular, to detect a low load condition with improved accuracy. The invention is based on the principles of chopping and low-pass filtering before comparing the power switch voltage drop and the replica device voltage drop. In some applications, it is desirable to refer the threshold current to the inductor current, rather than the input current or the output current. This is easily achieved by the proposed invention by simple logic configuration. The proposed technique can be applied to average current-mode control topologies where it is desirable to regulate the output current rather than the input current. In this case, the control loop will compare the chopped and filtered sense current against a current reference.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A buck-boost mode power converter configured to detect a light load condition at an output of the power converter, the power converter comprising
   an inductor;
   a high side buck switching element connected between an input of the power converter and an input of the inductor;
   a low side buck switching element coupled between the input of the inductor and ground;
   a high side boost switching element coupled between the output of the power converter and an output of the inductor;
   a low side boost switching element coupled between the output of the inductor and ground;
   a first chopping unit configured to generate a chopped voltage signal at an output of said first chopping unit, wherein the chopped voltage signal is generated by chopping an inductor voltage at the input of said inductor, wherein said first chopping unit comprises a first switching element and a second switching element, wherein the first switching element is connected between the input of said inductor and the output of the first chopping unit, and wherein the second switching element is connected between the input of said power converter and the output of the first chopping unit;
   a replica resistive element coupled between the input of the power converter and a reference potential, wherein the replica resistive element is a switching element configured to connect the input of the power converter to the reference potential or to isolate the reference potential from the input of the power converter;

a reference current source, wherein said reference current source and said replica resistive element are arranged in series; and a comparator unit configured to generate, based on the reference potential and based on the chopped voltage signal, a signal indicative of said light load condition;

wherein the first chopping unit is configured to sense the inductor voltage at the input of said inductor during time intervals when the high side boost power switch is closed; and wherein the power converter is configured to
switch the replica resistive element in synchronism with the high side buck switching element, and
switch the first switching element in synchronism with the high side boost switching element.

2. The power converter according to claim 1, further comprising a first integrator coupled between the first chopping unit and said comparator unit, wherein said first integrator is configured to determine an averaged voltage value based on said chopped voltage signal.

3. The power converter according to claim 2, wherein the first integrator comprises a first low pass filter.

4. The power converter according to claim 1, wherein the power converter is configured to
switch the first switching element in synchronism with the high side boost switching element, and
switch the second switching element in synchronism with the low side boost switching element.

5. The power converter according to claim 1, further comprising a third switching element connected between the input of the power converter and the reference potential, wherein the power converter is configured to switch the third switching element in synchronism with the high side buck switching element.

6. The power converter according to claim 5, further comprising a second integrator coupled between the reference potential and said comparator unit, wherein said second integrator is configured to determine an averaged voltage value based on said reference potential.

7. The power converter according to claim 1, further comprising at least one integrate-and-dump circuit, wherein the power converter is configured to
determine a first estimate for an output current of the power converter during a first time interval using the at least one integrate-and-dump circuit,
determine a second estimate for the output current of the power converter during a second time interval using the at least one integrate-and-dump circuit,
determine a third estimate for the output current of the power converter during a third time interval based on the inductor voltage sampled at a first time during the first time interval and based on the inductor voltage sampled at a second time during the second time interval.

8. The power converter according to claim 7, wherein the first time is the starting time of the first time interval and the second time is the end time of the second time interval, and wherein the third estimate is obtained by averaging the inductor voltage at the first time and at the second time.

9. The power converter according to claim 8, wherein the power converter is configured to determine a sum or an average value for the output current for the first, the second, and the third time interval by averaging the first, the second, and the third estimate for the output current.

10. A method for detecting a light load condition at an output of a power converter, wherein the power converter is a buck-boost mode power converter, the power converter comprising
an inductor;
a high side buck switching element connected between an input of the power converter and an input of the inductor;
a low side buck switching element coupled between the input of the inductor and ground;
a high side boost switching element coupled between the output of the power converter and an output of the inductor;
a low side boost switching element coupled between the output of the inductor and ground;
a first chopping unit for generating a chopped voltage signal at an output of said first chopping unit, wherein the chopped voltage signal is generated by chopping an inductor voltage at the input of said inductor, wherein said first chopping unit comprises a first switching element and a second switching element, wherein the first switching element is connected between the input of said inductor and the output of the first chopping unit, and wherein the second switching element is connected between the input of said power converter and the output of the first chopping unit;
a replica resistive element coupled between the input of the power converter and a reference potential, wherein the replica resistive element is a switching element configured to connect the input of the power converter to the reference potential or to isolate the reference potential from the input of the power converter;
a reference current source, wherein said reference current source and said replica resistive element are arranged in series; and
a comparator unit for generating, based on the reference potential and based on the chopped voltage signal, a signal indicative of said light load condition;
wherein the method comprises
sensing, using the first chopping unit, the inductor voltage at the input of said inductor during time intervals when the high side boost power switch is closed;
switching the replica resistive element in synchronism with the high side buck switching element; and
switching the first switching element in synchronism with the high side boost switching element.

* * * * *